US 6,651,116 B1

(12) United States Patent
Ludwig et al.

(10) Patent No.: US 6,651,116 B1
(45) Date of Patent: Nov. 18, 2003

(54) OUTPUT INTERFACE FOR A RASTER OBJECT MEMORY IN A METHOD, SYSTEM AND PROGRAM

(75) Inventors: Steven G. Ludwig, Broomfield, CO (US); Stephen D. Hanna, Longmont, CO (US); Howard C. Jackson, Loveland, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,051

(22) Filed: May 15, 2000

(51) Int. Cl.[7] .................................................. G06F 13/00
(52) U.S. Cl. ............................ 710/33; 710/34; 710/52; 710/53; 710/54
(58) Field of Search ..................... 710/20, 21, 33–35, 710/52, 53, 54, 55

(56) References Cited

U.S. PATENT DOCUMENTS

| 4,371,932 | A | * | 2/1983 | Dinwiddie et al. ........... 710/21 |
| 5,179,663 | A | * | 1/1993 | Iimura ........................ 710/35 |
| 5,179,683 | A | * | 1/1993 | Murakami et al. ............. 710/21 |
| 5,392,392 | A |   | 2/1995 | Fischer et al. ............... 395/162 |
| 5,615,314 | A |   | 3/1997 | Schoenzeit et al. .......... 395/114 |
| 5,638,498 | A |   | 6/1997 | Tyler et al. .................. 395/117 |
| 5,701,513 | A | * | 12/1997 | Kaneko ....................... 710/119 |
| 5,737,503 | A |   | 4/1998 | Mitani |
| 5,809,261 | A | * | 9/1998 | Lambrecht ................... 710/21 |
| 5,857,067 | A |   | 1/1999 | Hassett et al. ............... 395/150 |
| 5,870,535 | A | * | 2/1999 | Duffin et al. ............... 358/1.16 |
| 5,892,890 | A |   | 4/1999 | Clouthier et al. ............ 395/104 |
| 5,946,003 | A |   | 8/1999 | Zakharia ..................... 345/501 |
| 6,040,917 | A |   | 3/2000 | Campbell et al. ........... 358/1.17 |
| 6,052,202 | A | * | 4/2000 | Shimizu ...................... 358/1.16 |
| 6,105,083 | A | * | 8/2000 | Kurtze et al. ................ 710/106 |
| 6,330,585 | B1 | * | 12/2001 | Casper et al. ............... 709/200 |
| 6,441,919 | B1 | * | 8/2002 | Parker et al. ............... 358/1.18 |

FOREIGN PATENT DOCUMENTS

| EP | 0962854 | 12/1999 | ............ G06F/3/12 |
| WO | WO9002386 | 3/1991 | ........... G06F/15/20 |

* cited by examiner

Primary Examiner—Jeffrey Gaffin
Assistant Examiner—Eron Sorrell
(74) Attorney, Agent, or Firm—Bracewell & Patterson, LLP; Scott W. Reid

(57) ABSTRACT

An output interface allows a user circuit to access data for multiple objects in an interleaved fashion. Status information is provided to guarantee data availability before each transfer sequence is started. An identifier is provided for each object. Each identifier, after data transfer has ended, may be subsequently reused to identify a different object. The interface provides the ability to retrieve all data in an object or to cancel the object before reaching the end and discarding the unretrieved data. The objects are provided to the appropriate processing mechanisms within the printer to implement a printing task. These objects correspond to images and text to be printed on a page. Object data is temporarily stored in limited data memory of the memory system and object headers are stored in header memory before transfer via the output interface. Each object to be printed has an object header and may, or may not, have associated object data.

12 Claims, 15 Drawing Sheets

Notes
A   This time can be extended by the PCI function
B   This relationship is fixed

Notes
A   This time can be extended by the PCI function
B   This relationship is fixed

Notes
A  This time can be extended by the PCI function
B  This relationship is fixed

OUTPUT INTERFACE FOR A RASTER OBJECT MEMORY IN A METHOD, SYSTEM AND PROGRAM

RELATED APPLICATIONS

The present invention is related to the subject matter of the following commonly assigned, U.S. patent application Ser. No. 09/571,000 entitled "Input Interface for a Raster Object Memory System" and filed, May 15, 2000; and Ser. No. 09/570,987 entitled "Raster Object Memory System" and filed May 15, 2000; Ser. No. 09/570,211 entitled "Method, System and Logic for Selecting Line Work and Control Data for a Pixel from Multiple Objects of Line Work Data Provided for the Pixel" and filed May 12, 2000; and Ser. No. 09/569,777 entitled "Method, System, Program and Data Structure for Generating Raster Objects" filed May 12, 2000. The content of the above-referenced applications is incorporated herein by reference.

BACKGROUND OF THE INVENTION

1. Technical Field

The present invention generally relates to computer graphics and in particular to raster based graphic generation. Still more particularly, the present invention relates to random access memory associated with raster object data.

2. Description of the Related Art

Raster Image Processors generally consist of hardware and software that converts vector graphics into raster (bitmapped) images. These processors are used in page printers, phototypesetters, and electrostatic plotters. Raster image processing can be of considerable duration, particularly for the printing of large-sized graphical images containing large numbers of pixels.

Today's printers take compressed data, typically, from a Reduced Instruction Set Computer (RISC) processor through a system bus, e.g. PCI bus, into a circuit board in the printer. The data is compressed, saved in memory and then sent to the circuit board over the system bus. The circuit board serves as an interface between the computer and the printer. Data is stored in memory on the printer circuit board for decompression and other processing such as merge and screen functions. The data is then sent to the printer. A need for faster throughput at the printer may require a large amount of pre-processing. Color and graphic data would have to be processed and stored in permanent memory, off printer, and beforehand in order to produce a "quick" print job. An involved graphics print job may involve pre-processing and storing the job in permanent memory the day before the job is started.

It would therefore be desirable to provide a method, system and program that would reduce the need for large amounts of memory for a high volume printer. It would also be desirable to provide a method that would reduce the preparation time for color printing jobs.

SUMMARY OF THE INVENTION

It is therefore one object of the present invention to provide access to raster object data and headers at high speed.

It is another object of the present invention to provide object data in a continuous stream to a color printer.

It is yet another object of the present invention to provide a system to allow high performance with low latency for multiple processors of multiple interleaved objects.

The foregoing objects are achieved as is now described. An output interface allows a user circuit to access data for multiple objects in an interleaved fashion. Status information is provided to guarantee data availability before each transfer sequence is started. An identifier is provided for each object. Each identifier, after data transfer has ended, may be subsequently reused to identify a different object. The interface provides the ability to retrieve all data in an object or to cancel the object before reaching the end and discarding the unretrieved data. The objects are provided to the appropriate processing mechanisms within the printer to implement a printing task. These objects correspond to images and text to be printed on a page. Object data is temporarily stored in limited data memory of the memory system and object headers are stored in header memory before transfer via the output interface.

Each object to be printed has an object header and may, or may not, have associated object data.

A memory system is enabled to access data for multiple objects in an interleaved fashion. Object data is retrieved from a system bus via an input interface, is temporarily stored in a limited data memory of the memory system and object headers are stored in a header memory. Each object to be printed has an object header and may, or may not, have associated object data. A "skip" function is provided in an input interface to the memory system to terminate a transfer function if object data is not ready. The memory system is enabled to retrieve all data in an object or to cancel the object before the end of the data is reached. An identifier is associated with each data object and is subsequently reused after the original data object is transferred or cancelled. A plurality of request levels is assigned to each data request to indicate the urgency of the request. This enables multiple memory systems to operate from a single data transfer function.

The memory system, comprising dual-port memory, is provided to store object data for at least twenty-four objects at a time. The data objects are divided into groups comprising Line Work control, line work data and continuous tone. The memory system is designed to act as multiple first-in-first-out memories enabling the input portion of the memory system to deposit data into the memory at the same time as three users are extracting data from the memory. After an object has passed through the first-in-firs-out memory, the memory is re-used for a new object. A re-usable identifier is assigned to each data object and re-assigned to a new object once the original data objects cancelled.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6A illustrates a user requesting and being given data; FIG. 6B depicts a user requesting an object ID for the next new object; FIG. 6C illustrates a user canceling an object because all processing of this object has been completed;

DETAILED DESCRIPTION OF THE PREFERRED EMBODIMENT

Figure 1A:
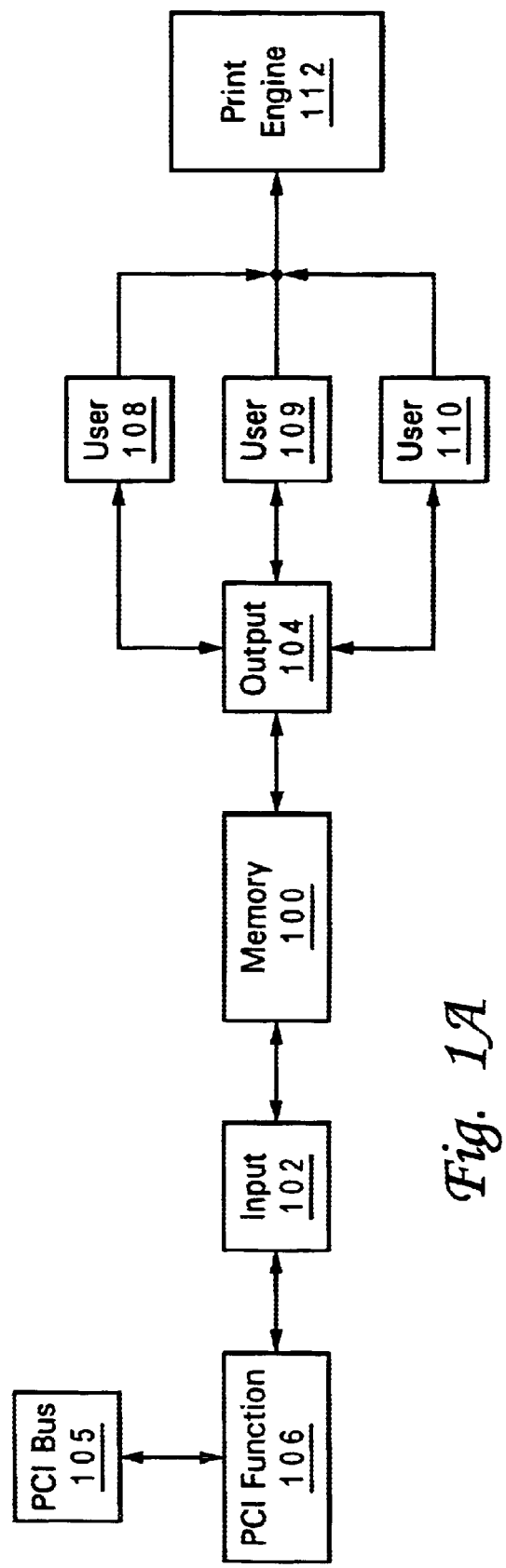
FIG. 1 depicts. a high-level block diagram of a memory device in which a preferred embodiment of the present invention may be implemented.

With reference now to the figures, and in particular with reference to FIG. 1A, a high-level block diagram of a memory device in which a preferred embodiment of the present invention may be implemented is depicted. The present invention comprises three functions: input interface 102, memory system 100, and output interface 104. PCI function 106 obtains objects through PCI bus 105 from RISC processor memory. PCI function 106 then supplies data objects to input interface 102. Memory system 100 automatically requests data from PCI function 106 in order to keep memory system 100 filled with data. Memory system 100 requests data so that the data will be immediately available to users 108–110 when it is required. The data request originates with memory system 100 and is passed on to input 102 which passes the request to PCI function 106. Input 102 provides a selection order to PCI function 106, so as to provide the most critical data to the most needy user. The plurality of users 108–110 each have a different function, in this embodiment, and process different portions of the requested data objects. There are two types of users, line work (LW) and continuous tone (CT). LW is further divided into two groups, control (LWC) and data (LWD). Users 108–110 further process and send the data, ultimately, to the printer's print engine 112.

Figure 1B:
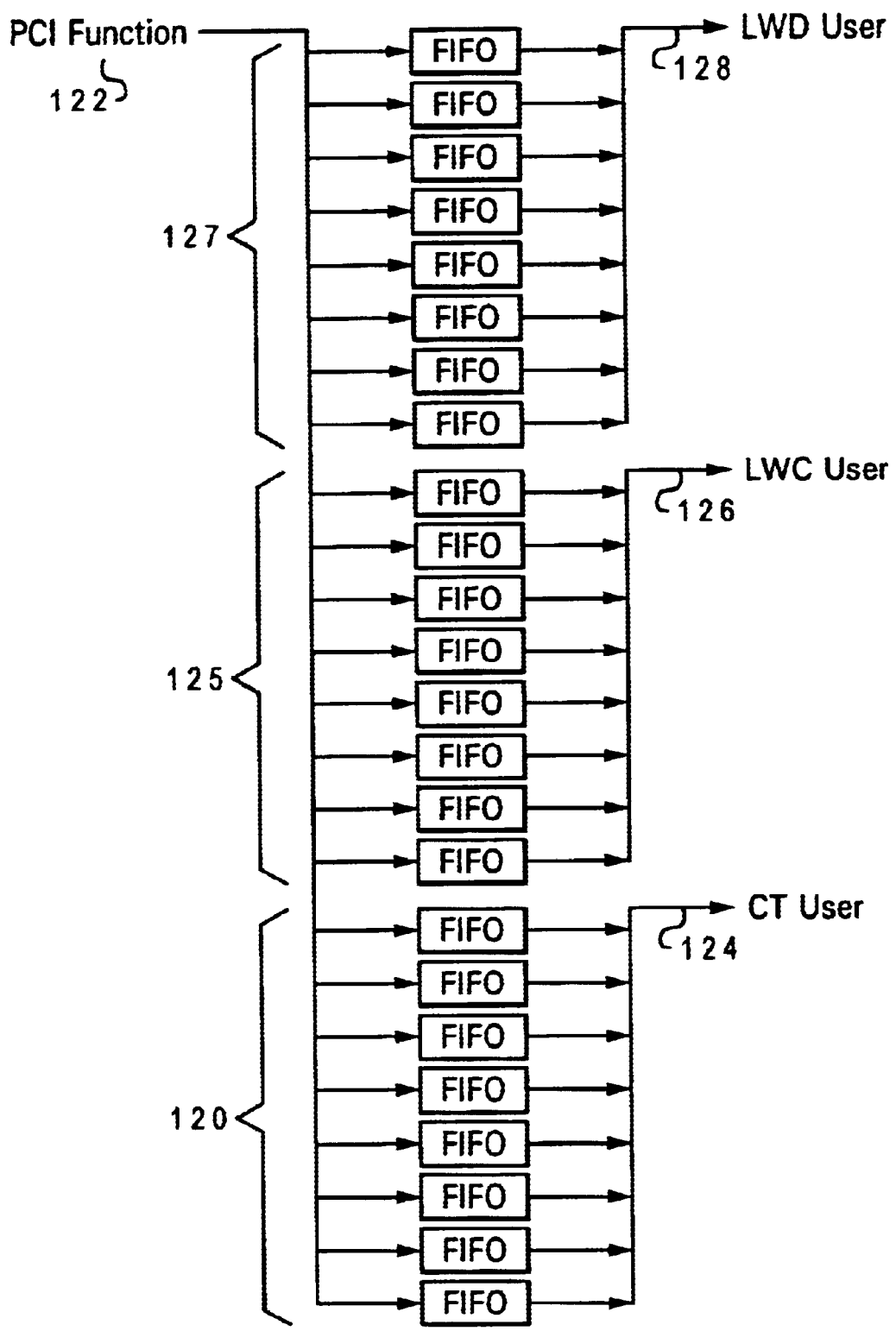

Referring to FIG. 1B, a block diagram of the memory system in accordance with a preferred embodiment of the present invention is illustrated. The internal architecture of memory system 100 is designed to function as twenty-four separate first-in-first-out (FIFO) memories, in this embodiment. Each FIFO is used for data associated with an object.

Once an object has passed through the FIFO, the FIFO memory will be used for a new object. FIFO memories have no address, just an input port and an output port. Data words enter the input port and the data words become immediately available from the output port in the same order.

The FIFO memory is divided into independent groups. One group 120 is assigned to support CT user 124, one group 125 is assigned to support LWC user 126 and the last group 127 is assigned to support LWD user 128. FIFOs that support LWD user 128 are four times as large as the other FIFOs because the LWD user typically requires more data and at a higher data rate. Each user is restricted to using no more than four FIFOs at a time so that a reserve FIFO is available for each FIFO being used. This allows for instantaneous switching from a canceled object to a new object.

Figure 2:
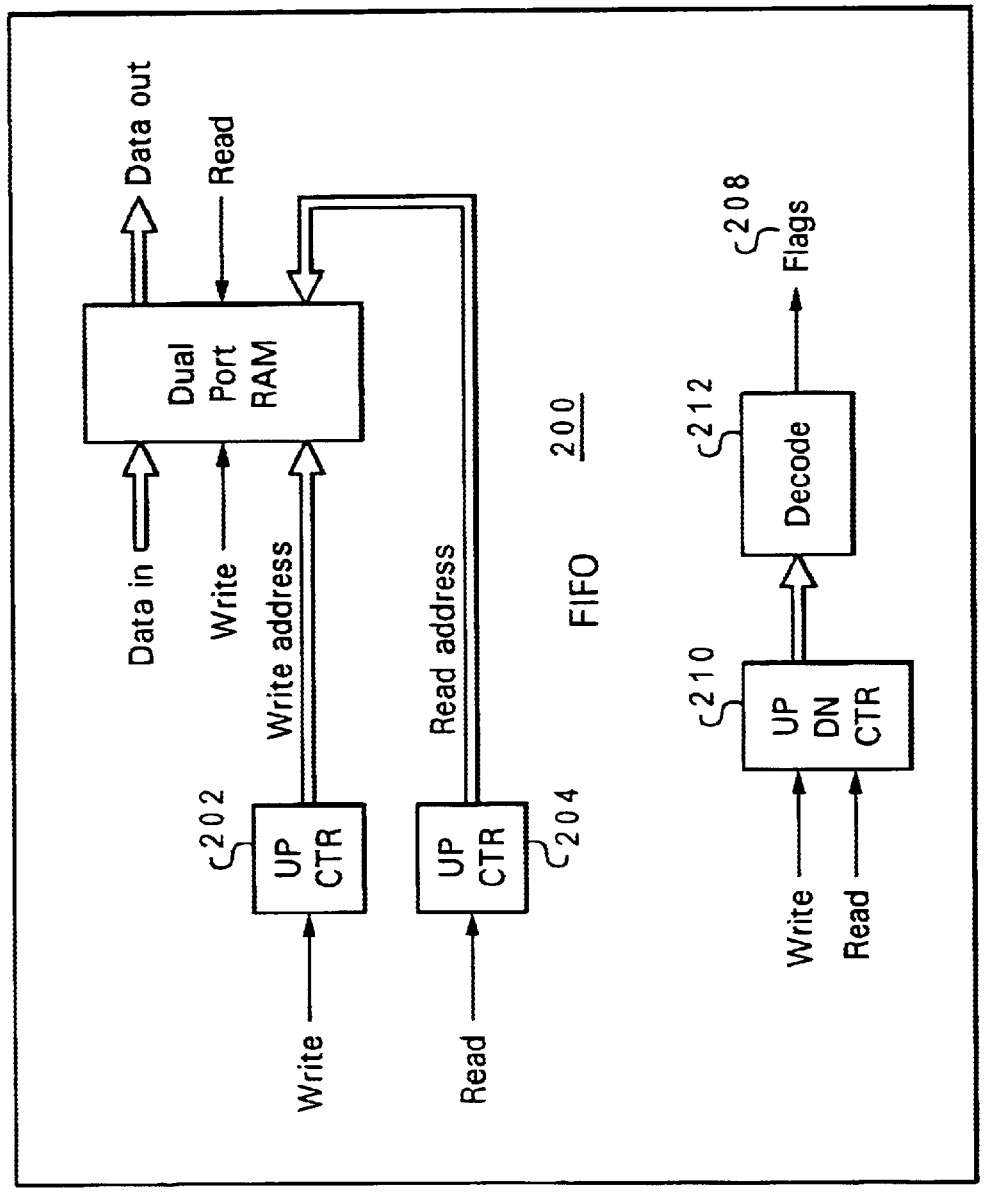
FIG. 2 illustrates a FIFO in accordance with a preferred embodiment of the present invention.

Referring now to FIG. 2, a FIFO is depicted in accordance with a preferred embodiment of the present invention. Each of the twenty four FIFOs depicted in FIG. 1B has its own set of addresses and flags. FIFO 200 is comprised of dual-port static RAM and two counters wherein counter 202 is incremented after each write operation. Counter 204 is incremented after each read operation. Flags 208 are generated by up/down counter 210 and decoder 212 and are used to indicate the amount of data in FIFO 200. Counter 210 is incremented after each write operation and decremented after each read operation.

The value in counter 210 is the number of words of data in FIFO 200 and decoder 212 determines the following memory states:

| | |
|---|---|
| Empty | count is zero |
| Almost Empty | count is less than 128 |
| Middle | count is between "Almost Empty "and "Almost Full" |
| Almost Full | count is less than 128 from the maximum |
| Full | count is at the maximum |

Memory is divided into independent sections. These individual sections are selected by means of an object ID field and a user ID field. The object ID is a 3-bit field that selects one of the eight FIFOs within a group. The user group selected is determined by the user ID. The bit settings are defined as follows:

| | |
|---|---|
| 00 | CT |
| 01 | not used |
| 10 | LWD |
| 11 | LWC. |

The memory system assigns an arbitrary identification number (ID) to each object that has data in memory. The users (CT, LWD, or LWC) will initiate a cancel operation when an object is no longer needed. The mechanism employed to keep track of the objects in memory is the object status queue.

Two banks of registers are used tokeep track of object status while the object is in memory. Each bank is composed of eight registers and referred to as a queue. One queue is assigned to the continuous tone user and the other queue is assigned to the line-work users. Each queue operates independently from the other. Each queue register holds status information for a specific object while the object is in memory. Queue registers within a bank are connected to each other in a left to right fashion so that partial shifting can be done. An object's position in the queue represents its relative age and the relative order that the objects were made available to the memory. The object represented by the rightmost register is this user's oldest object. A queue register holds the following information:

TABLE 1

| Name | Size | Description |
| --- | --- | --- |
| ID | 3-bits | Holds a unique value that is used as an identifier for the object |
| VALID | 1-bit | Indicates whether this queue register contains valid status |
| ASSIGNED | 1-bit | Indicates whether the object ID has been assigned to the user |
| HEADER | 1-bit | Indicates whether the object has data in the header memory |

The HEADER and ASSIGNED bits are used in the decision making process to decide which object should be selected to receive more data from the PCI function. The ASSIGNED bit is also used to keep track of which objects are known to the user and which are being held in the memory as backups. When the user requests a new ID, the rightmost queue register with the ASSIGNED bit off is selected. The ID in this register is sent to the user and the ASSIGNED bit is turned on.

When the memory has empty space for one or more new objects, the rightmost queue register with the HEADER bit off is selected. The ID in this register is sent to the PCI with a request for data. If the request is honored and completes normally, the HEADER bit is turned on. When the leftmost queue register is not valid (VALID bit is off), all of the Ids in the other registers are examined so that a new unique ID can be created. This new ID is stored in the ID field, the HEADER and ASSIGNED bits are turned off, and the VALID bit is turned on. All the queue register operations involving ID, ASSIGNED and HEADER bits check the VALID bit first to make sure that only valid status bits are used. When an object is canceled, all the registers are examined to find the register that contains the ID being canceled and the valid bit is turned off. Next, all the queue registers to the left of this register are shifted one position to the right and the leftmost register is reset to an invalid object status.

An object selection scheme (FIG. 3) uses the object status along with the memory flags to select a particular object. Once the object is selected, a data request is sent to the PCI function. If the request for data is for a new object, the PCI function will start by putting header data into the header memory. When this "new object" transfer is complete, the HEADER bit is set. When a user requests a new ID, the appropriate queue is searched from right to left for the first unassigned register (ASSIGNED bit is off). The ID in this register is sent to the user and the ASSIGNED bit is turned on.

The memory system will automatically request data from the PCI function in an attempt to fill the memory with data for eight CT objects, eight LWC objects and eight LWD objects. An object selection scheme is then employed to determine whether to go after a new object or to get more data for an existing object. The urgency of this data request is indicated by four request levels. Request level 1 is most urgent and request level 4 is least urgent.

Two memory systems are connected to a single PCI function. The PCI function will service each memory on a first come, first service basis. When both memories request data simultaneously, the PCI function services the memory having the most urgent request level.

The PCI function will send an EMPTY signal to the memory when no more data can be obtained for a particular object. This special status is saved in a register that is not part of the status queue. The selection scheme also uses this empty status when making a selection so that data is never requested for an empty object.

The PCI function, and the memory, transfer data in bursts of up to thirty-two words. Once a transfer is started, the memory will keep taking data until the PCI function terminates the transfer. The memory system will not request the data unless it has at least thirty-two empty memory locations. This method guarantees that the PCI function will never overrun the memory.

Figure 3:
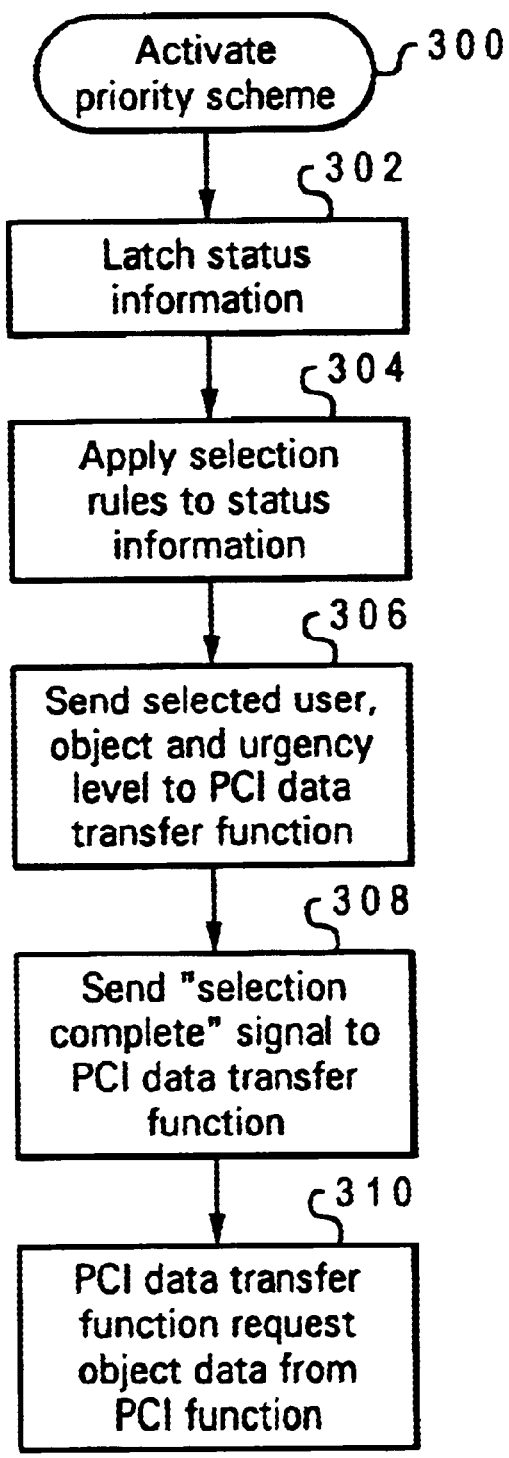
FIG. 3 is a selection process for determining whether a new object should be retrieved, or more data for an existing object, in accordance with a preferred embodiment of the present invention.

Referring now to FIG. 3, a selection process for determining whether a new object should be retrieved, or more data for an existing object should be retrieved in accordance with a preferred embodiment of the present invention, is illustrated. This selection process also determines which existing object should get additional data and determine the urgency of the data request to be made. The process begins with step 300, which depicts activation of a selection mechanism, following a data request by a user. The process continues with step 302, which illustrates the memory system latching all status information necessary to decide which memory section is most in need of data. Additionally, the status information is held stable until the determination is made. The process then passes to step 304 which depicts a set of selection rules being applied to the status information.

The following pseudo-code illustrates an exemplary embodiment of a method utilizing the selection rules, or object selection scheme, as they are applied to the queue registers that hold object status and ID information. The queue registers are numbered so that position #1 (P1) has the information for the oldest object and the higher the P# indicates a newer object. The terms used in the pseudo-code are defined as follows:

"P#" is a position in the identified queue;

"exists" indicates that the object is not new to the memory;

"Low" indicates that the memory FIFO is almost empty;

"OK" indicates that the memory FIFO is not almost empty and not almost full.

"not empty" indicates that the object still has data in the computer's memory.

"SKIPLW" indicates that a new LW object should not be fetched.

"SKIPCT" indicates that a new CT object should not be fetched.

"FAIRNESS" is a function which toggles between active and inactive states each time a selection is attempted.

Request levels (RL1, RL2, RL3 and RL4) are used to specify the urgency of the selection. RL1 is most urgent and RL4 is least urgent.

The following tests are performed logically in sequence such that once a selection is made, then none of the remaining tests are performed.

If the LWD object of LW queue P1 is low and not empty and exists then select the LWD P1 object at RL1.

else If the LWD object of LW queue P2 is low and not empty and exists then select the LWD P2 object at RL1.

else If the LWD object of LW queue P3 is low and not empty and exists then select the LWD P3 object at RL1.

else If the LWD object of LW queue P4 is low and not empty and exists then select the LWD P4 object at RL1.
else If the LWC object of LW queue P1 is low and not empty and exists then select the LWC P1 object at RL1.
else If the LWC object of LW queue P2 is low and not empty and exists then select the LWC P2 object at RL1.
else If the LWC object of LW queue P3 is low and not empty and exists then select the LWC P3 object at RL1.
else If the LWC object of LW queue P4 is low and not empty and exists then select the LWC P4 object at RL1.
else If the CT object of CT queue P1 is low and not empty and exists then select the CT P1 object at RL1.
else If the CT object of CT queue P2 is low and not empty and exists then select the CT P2 object at RL1.
else If the CT object of CT queue P3 is low and not empty and exists then select the CT P3 object at RL1.
else If the CT object of CT queue P4 is low and not empty and exists then select the CT P4 object at RL1.
else If the LW object of LW queue P1 doesn't exist and SKIPLW is not active then select the LWD P1 object at RL1.
else If the LW object of LW queue P2 doesn't exist and SKIPLW is not active then select the LWD P2 object at RL1.
else If the LW object of LW queue P3 doesn't exist and SKIPLW is not active then select the LWD P3 object at RL1.
else If the LW object of LW queue P4 doesn't exist and SKIPLW is not active then select the LWD P4 object at RL1.
else If the CT object of CT queue P1 doesn't exist and SKIPCT is not active then select the CT P1 object at RL1.
else If the CT object of CT queue P2 doesn't exist and SKIPCT is not active then select the CT P2 object at RL1.
else If the CT object of CT queue P3 doesn't exist and SKIPCT is not active then select the CT P3 object at RL1.
else If the CT object of CT queue P4 doesn't exist and SKIPCT is not active then select the CT P4 object at RL1.
else If the LWD object of LW queue P1 is OK and not empty then select the LWD P1 object at RL2.
else If the LWD object of LW queue P2 is OK and not empty then select the LWD P2 object at RL2.
else If the LWD object of LW queue P3 is OK and not empty then select the LWD P3 object at RL2.
else If the LWD object of LW queue P4 is OK and not empty then select the LWD P4 object at RL2.
else If the LWC object of LW queue P1 is OK and not empty then select the LWC P1 object at RL2.
else If the LWC object of LW queue P2 is OK and not empty then select the LWC P2 object at RL2.
else If the LWC object of LW queue P3 is OK and not empty then select the LWC P3 object at RL2.
else If the LWC object of LW queue P4 is OK and not empty then select the LWC P4 object at RL2.
else If the CT object of CT queue P1 is OK and not empty then select the CT P1 object at RL2.
else If the CT object of CT queue P2 is OK and not empty then select the CT P2 object at RL2.
else If the CT object of CT queue P3 is OK and not empty then select the CT P3 object at RL2.
else If the CT object of CT queue P4 is OK and not empty then select the CT P4 object at RL2.
else If the LWD object of LW queue P5 is low and not empty and exists then select the LWD P5 object at RL3.
else If the LWD object of LW queue P6 is low and not empty and exists then select the LWD P6 object at RL3.
else If the LWD object of LW queue P7 is low and not empty and exists then select the LWD P7 object at RL3.
else If the LWD object of LW queue P8 is low and not empty and exists then select the LWD P8 object at RL3.
else If the LWC object of LW queue P5 is low and not empty and exists then select the LWC P5 object at RL3.
else If the LWC object of LW queue P6 is low and not empty and exists then select the LWC P6 object at RL3.
else If the LWC object of LW queue P7 is low and not empty and exists then select the LWC P7 object at RL3.
else If the LWC object of LW queue P8 is low and not empty and exists then select the LWC P8 object at RL3.
else If the CT object of CT queue P5 is low and not empty and exists then select the CT P5 object at RL3.
else If the CT object of CT queue P6 is low and not empty and exists then select the CT P6 object at RL3.
else If the CT object of CT queue P7 is low and not empty and exists then select the CT P7 object at RL3.
else If the CT object of CT queue P8 is low and not empty and exists then select the CT P8 object at RL3.
else If the LW object of LW queue P5 doesn't exist and SKIPLW is not active then select the LWD P5 object at RL3.
else If the LW object of LW queue P6 doesn't exist and SKIPLW is not active then select the LWD P6 object at RL3.
else If the LW object of LW queue P7 doesn't exist and SKIPLW is not active then select the LWD P7 object at RL3.
else If the LW object of LW queue P8 doesn't exist and SKIPLW is not active then select the LWD P8 object at RL3.
else If the CT object of CT queue P5 doesn't exist and SKIPCT is not active then select the CT P5 object at RL3.
else If the CT object of CT queue P6 doesn't exist and SKIPCT is not active then select the CT P6 object at RL3.
else If the CT object of CT queue P7 doesn't exist and SKIPCT is not active then select the CT P7 object at RL3.
else If the CT object of CT queue P8 doesn't exist and SKIPCT is not active then select the CT P8 object at RL3.
else If the LWD object of LW queue P5 is OK and not empty then select the LWD P5 object at RL4.
else If the LWD object of LW queue P6 is OK and not empty then select the LWD P6 object at RL4.
else If the LWD object of LW queue P7 is OK and not empty then select the LWD P7 object at RL4.
else If the LWD object of LW queue P8 is OK and not empty then select the LWD P8 object at RL4.
else If the LWC object of LW queue P5 is OK and not empty then select the LWC P5 object at RL4.
else If the LWC object of LW queue P6 is OK and not empty then select the LWC P6 object at RL4.
else If the LWC object of LW queue P7 is OK and not empty then select the LWC P7 object at RL4.
else If the LWC object of LW queue P8 is OK and not empty then select the LWC P8 object at RL4.
else If the CT object of CT queue P5 is OK and not empty then select the CT P5 object at RL4.

else If the CT object of CT queue P6 is OK and not empty.
then select the CT P6 object at RL4.
else If the CT object of CT queue P7 is OK and not empty
then select the CT P7 object at RL4.
else If the CT object of CT queue P8 is OK and not empty
then select the CT P8 object at RL4.
else If the LW object of LW queue P1 doesn't exist and
FAIRNESS is not active then select the LWD P1 object at
RL4.
else If the LW object of LW queue P2 doesn't exist and
FAIRNESS is not active then select the LWD P2 object at
RL4.
else If the LW object of LW queue P3 doesn't exist and
FAIRNESS is not active then select the LWD P3 object at
RL4.
else If the LW object of LW queue P4 doesn't exist and
FAIRNESS is not active then select the LWD P4 object at
RL4.
else If the CT object of CT queue P1 doesn't exist and
FAIRNESS is active then select the CT P1 object at RL4.
else If the CT object of CT queue P2 doesn't exist and
FAIRNESS is active then select the CT P2 object at RL4.
else If the CT object of CT queue P3 doesn't exist and
FAIRNESS is active then select the CT P3 object at RL4.
else If the CT object of CT queue P4 doesn't exist and
FAIRNESS is active then select the CT P4 object at RL4.
else If the LW object of LW queue P5 doesn't exist and
FAIRNESS is active then select the LWD P5 object at
RL4.
else If the LW object of LW queue P6 doesn't exist and
FAIRNESS is active then select the LWD P6 object at
RL4.
else If the LW object of LW queue P7 doesn't exist and
FAIRNESS is active then select the LWD P7 object at
RL4.
else If the LW object of LW queue P8 doesn't exist and
FAIRNESS is active then select the LWD P8 object at
RL4.
else If the CT object of CT queue P5 doesn't exist and
FAIRNESS is not active then select the CT P5 object at
RL4.
else If the CT object of CT queue P6 doesn't exist and
FAIRNESS is not active then select the CT. P6 object at
RL4.
else If the CT object of CT queue P7 doesn't exist and
FAIRNESS is not active then select the CT P7 object at
RL4.
else If the CT object of CT queue P8 doesn't exist and
FAIRNESS is not active then select the CT P8 object at
RL4.
else make no selection.

The process then proceeds to step 306,which illustrates the selected user, object and urgency level being sent to the PCI Data Transfer Function (DTF). The PCI Data Transfer Function is the embodiment of the state machine illustrated in FIG. 7. Next the process passes to step 308, which depicts memory signaling that the current selection is complete by sending a selection complete signal to the PCI DTF. The PCI DTF then proceeds to request the required object data from the PCI function.

Figure 3A:
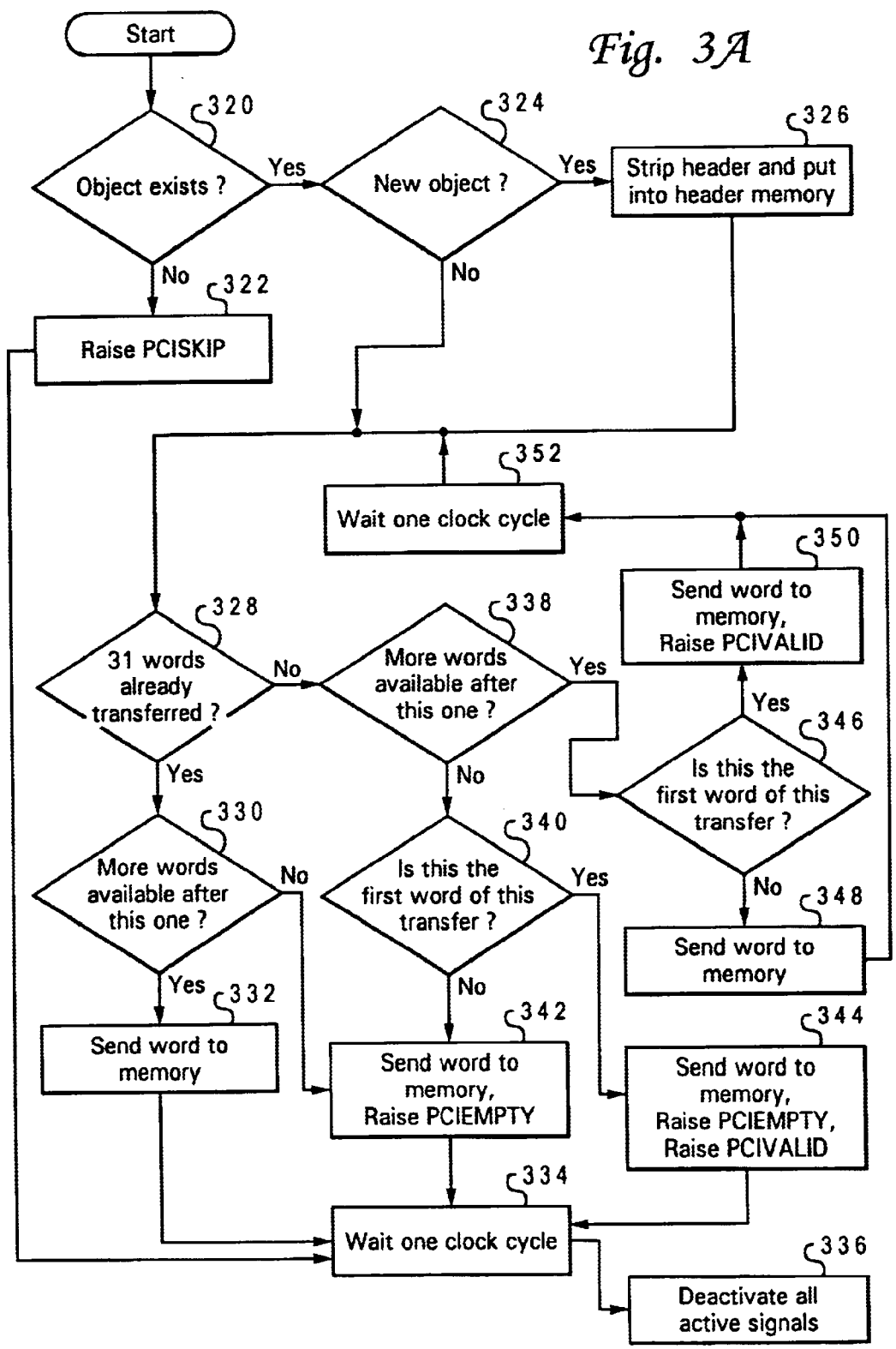
FIG. 3A depicts a high-level flow diagram of a method for transferring data objects from a computer system in accordance with the present invention.

Referring now to FIG. 3A, a high-level flow diagram of a method for transferring data objects from a computer system in accordance with the present invention is depicted. The process begins with step 320, which depicts a determination of whether a particular object exists. If not, the process passes to step 322, which illustrates raising the PCISKIP signal. The process continues to step 334, which depicts waiting for one clock cycle. The process then passes to step 336, which illustrates deactivation of all active signals.

Returning to step 320, if the determination is made that the particular object exists, the process then passes to step 324, which depicts a determination of whether the object is a new object. If not, the process skips step 326. If the object is a new object, the process proceeds instead to step 326, which illustrates stripping the object header and storing the header into a header memory. The process continues to step 328, which depicts a determination of whether thirty-one words have already been transferred. If thirty-one words have been transferred, the process then passes to step 330, which illustrates a determination of whether there are more words available for transfer. If there are more words, the process then passes to step 332, which depicts the interface sending the remaining word to memory. The process then passes to step 334 and on to step 336.

Returning to step 330, if the determination is made that there are no more words available, the process then proceeds to step 342, which illustrates sending the last word to memory, of the data object, and raising the PCIEMPTY signal. The process then passes to step 334 and on to step 336.

Returning to step 328, if the determination is made that thirty-one words have not transferred, the process proceeds instead to step 338, which depicts a determination of whether there are more words available. If not, the process passes to step 340, which illustrates a determination of whether the word being transferred is the first word of this particular transfer. If not, the process proceeds to step 342, where the PCIEMPTY signal is raised and the last word of this transfer is sent to memory. The process continues to step 334 and 336 to deactivate all the active signals. If the determination is made, in step 340, that this is the first word of the transfer, the process proceeds instead to ste 344, which illustrates sending the word to memory, raising PCIEMPTY and PCIVALID signals. The process then continues to step 334 and step 336.

Returning to step 338, if the determination is made that there are more words available, the process passes to step 346, which depicts a determination of whether this particular word is the first word of this transfer. If not, the process moves to step 348, which illustrates sending the word to memory. The process then continues to step 352, which depicts a wait for one clock cycle. The process continues to step 328, which checks to see if thirty-one words have been transferred.

Returning to step 346, if the determination is made that this particular word is the first word of a transfer, the process proceeds to step 350, which depicts sending the word to memory and raising PCIVALID signal. The process then passes to step 352 and then returns to step 328.

Sending Data

Data is only sent to a user in response to the user's request. Data is transferred in bursts of eight words unless the memory contains less that eight words. The user cannot terminate the data transfer so it must have the ability to accept all eight words.

Referring now to FIGS. 4A–4E, interface signal sequences, after an object is chosen for transfer, are illustrated in accordance with a preferred embodiment of the present invention. Reference to FIG. 1A, in conjunction with the interface signal sequences, will assist in the understanding of the interface function of the present invention (an explanation of state machine enablement precedes the explanation of FIGS. 4A–4E). The PCI function, as described in FIG. 1A, will respond to a transfer request in one of these four ways:

Skip—indicating that the object is unavailable at this time;

Empty—indicating that the object is empty.

Valid—indicating that data is now being transferred.

Valid, with Empty—indicating that the PCI function is sending data, and then the object becomes empty.

Figure 7:
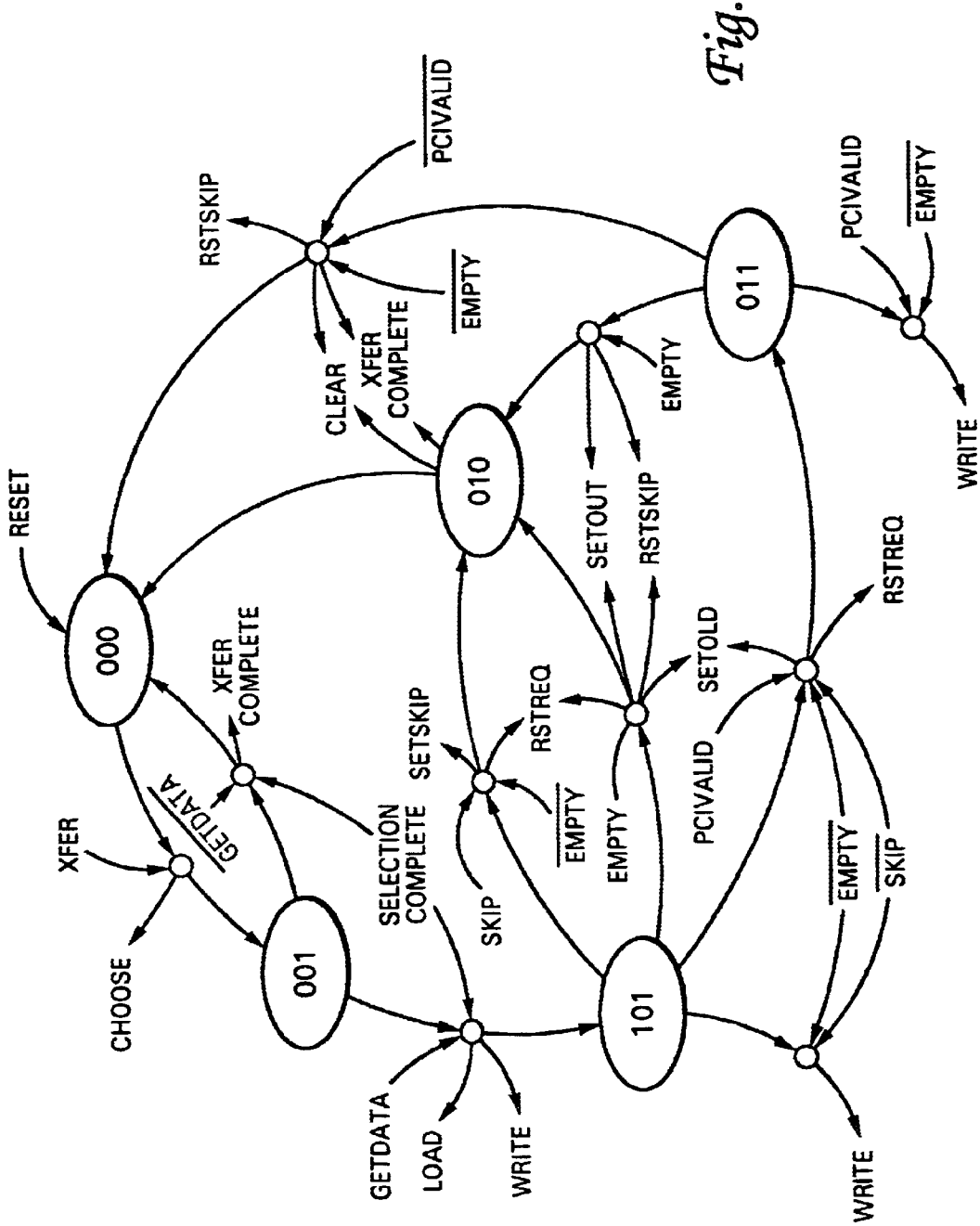
FIG. 7, illustrates a state machine for transferring data between the memory and PCI function in accordance with a preferred embodiment of the present invention.

A state machine performs the data transfer function between memory and the PCI function. As shown in FIG. 7, the first step is to activate a CHOOSE signal. This signal causes a choice to be made as to which section of memory should receive more data. Once the choice has been made the user and the object ID is saved in registers and gated to the PCI function. The request level chosen is also sent to the PCI function. The balance of this state machine manages the four possible responses made by the PCI function: Skip, Empty, Valid and Valid with empty.

PCI interface signals are used to perform the only two PCI to memory operations; transfer object data from the PCI function into the memory and notify the PCI function that a particular object is no longer needed. The PCI interface bus (not to be confused with the industry standard "PCI bus") is a positive active input to the memory and is used to transfer object data from the PCI function to the memory. The signals that communicate between the PCI function and the memory are described as follows:

PCI(32:0) is a positive active input to the memory. It is used to transfer the object data from the PCI function to the memory. Bit#32 is a parity bit representing even parity across the other thirty-two bits.

PCIREQ(4:1) is a set of mutually exclusive, positive active requests for data from the PCI function. They are outputs from the memory. The urgency of the request is indicated by the active bit (bit#1 is most urgent and bit#4 is least urgent).

PCIUSR(1:0) comprise two positive active bits and identify the type of object to the PCI function.

PCIOBJ(2:0) are three positive active bits that are memory outputs and identify one of the eight possible objects to the PCI function. Every object that passes through the memory is given an arbitrary identification number as defined by this bit combination. No two objects in memory at the same time and of the same type will ever have the same ID.

PCIVALID, a positive active signal, is an input to the memory. It is activated by the PCI function to signify that the data bus now contains valid data.

PCIEMPTY is a memory input. The PCI function activates this signal to indicate that the object, identified in a data request, is empty. It can be activated alone to indicate that no more data is available. It can also be activated during a data transfer with PCIVALID to indicate that the bus contains the last word of data.

PCISKIP is a memory input signal that is activated by the PCI function when the requested object is not yet available in the computer memory from which the objects originate. This will cause a pending data request to be canceled.

PCICANID an output from memory to the PCI function that tells the PCI function that the object identified by the PCIUSER and PCIOBJ signals is no longer needed and that the object ID will be reused.

PCIACK is a memory input signal that is positive active. It is activated by the PCI function to let the memory know that the pending cancel object function has been accepted. The memory is then free to remove the active signals and reuse the object ID.

Figure 4A:
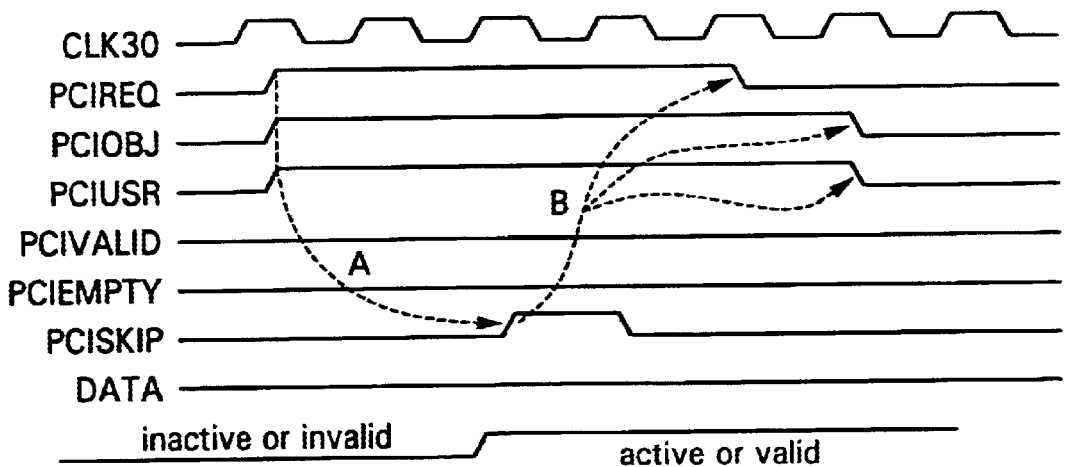
FIGS. 4A–4E illustrate interface input function signal sequences, after an object is chosen for transfer, in accordance with a preferred embodiment of the present invention.

The illustrative sequences, demonstrated in FIGS. 4A–4E, referred to above are now explained. FIG. 4A illustrates memory system 100 requesting data from PCI function 106. PCI function 106 responds with a skip and this indicates that the PCI doesn't yet have the object information available from the software. The PCI only issues a skip in response to a request for a new object. The memory terminates this request, then requests data for a different object. The memory eventually requests data for the skipped object again. The PCI may issue a skip again, but the software will eventually build the object and the PCI will service the request.

Figure 4B:
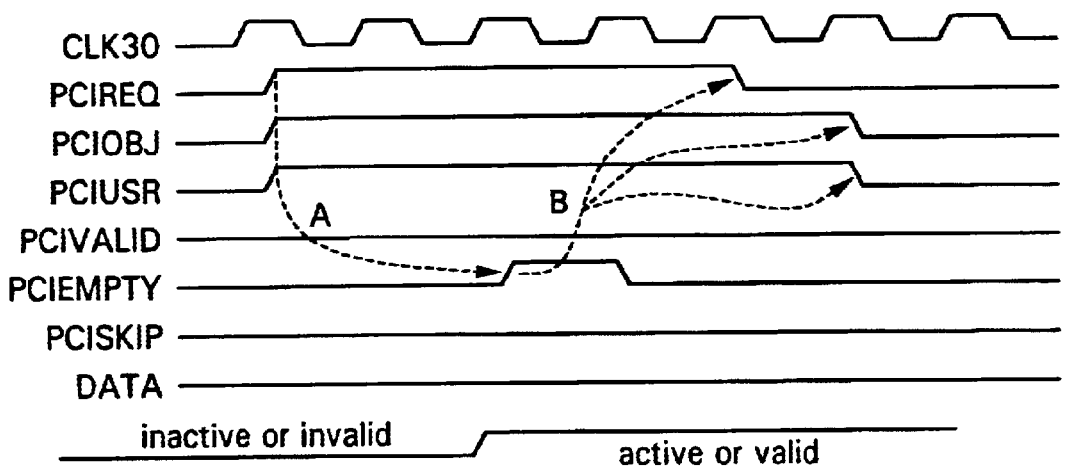

FIG. 4B depicts a sequence demonstrating the memory requesting data from the PCI function 106 which returns a response of EMPTY to the memory when no more data exists for the requested object. The empty signal can be the only response to a request or may occur during a data transfer operation (see valid with empty).

Figure 4C:
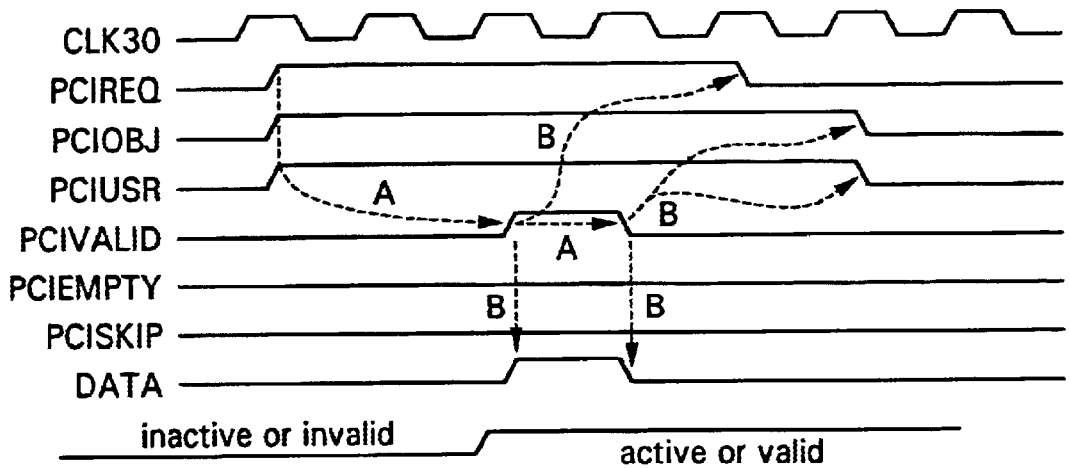

FIG. 4C illustrates the memory requesting data and the PCI function responding with a one word transfer. The PCI function 106 responds to a request for data with valid when it puts the data on the bus. The memory uses the valid signal as an enable command to store the data into the memory. The memory is synchronous and will continue to store data on each clock edge as long as valid is active. The memory also uses the valid signal to know when the transfer is being terminated by the PCI function 106. The maximum data transfer is thirty-two words.

Figure 4D:
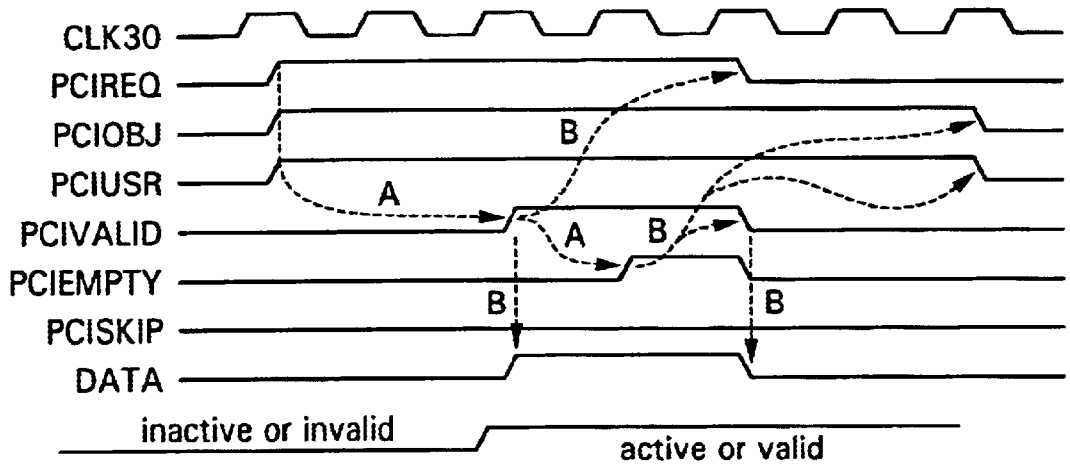

FIG. 4D depicts a memory request and the PCI function responding with two words of data. Additionally PCI function 106 informs the memory that the data object has become empty by raising PCIEMPTY during the last word of the transfer.

Figure 4E:
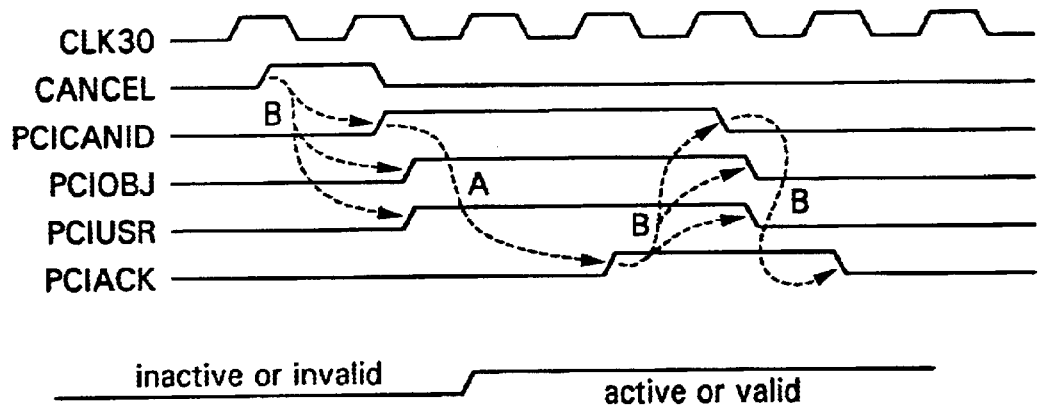

FIG. 4E shows the results of LW or CT user determining that no more data will be needed for one of the objects being processed. The memory is requested to cancel the object. The memory does the internal housekeeping and then notifies the PCI function by sending a cancel request with the appropriate user ID and object ID. This frees up memory space for the next new object.

Referring now to FIGS. 5A–5D, arbiter state machines in accordance with a preferred embodiment of the present invention are illustrated. Different memory operations take different amounts of time to complete and many of these operations affect the status queues. The arbiter is a state machine used to make sure that status queue updates are applied to each queue one at a time. The control diagram is quite large and has been separated into four sections for clarity.

Figure 5A:
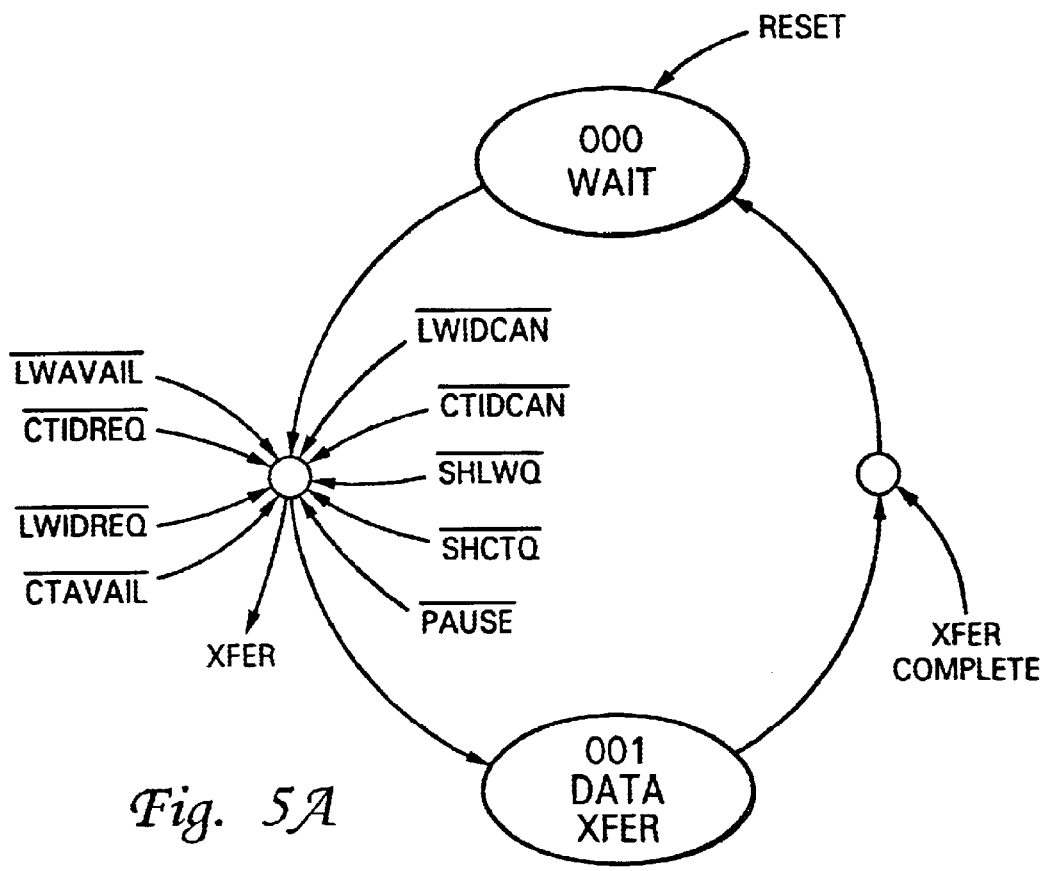
FIG. 5A illustrates data transfer from the PCI function to the memory system.

Referring to FIG. 5A, the arbiter function starts a data transfer between the memory and PCI function when no other operations are pending. The XFER signal from this state machine signals to the PCI data transfer function to start a transfer. The arbiter will remain in state "001" until the PCI Data Transfer Function signals back with XFER COMPLETE.

Figure 5B:
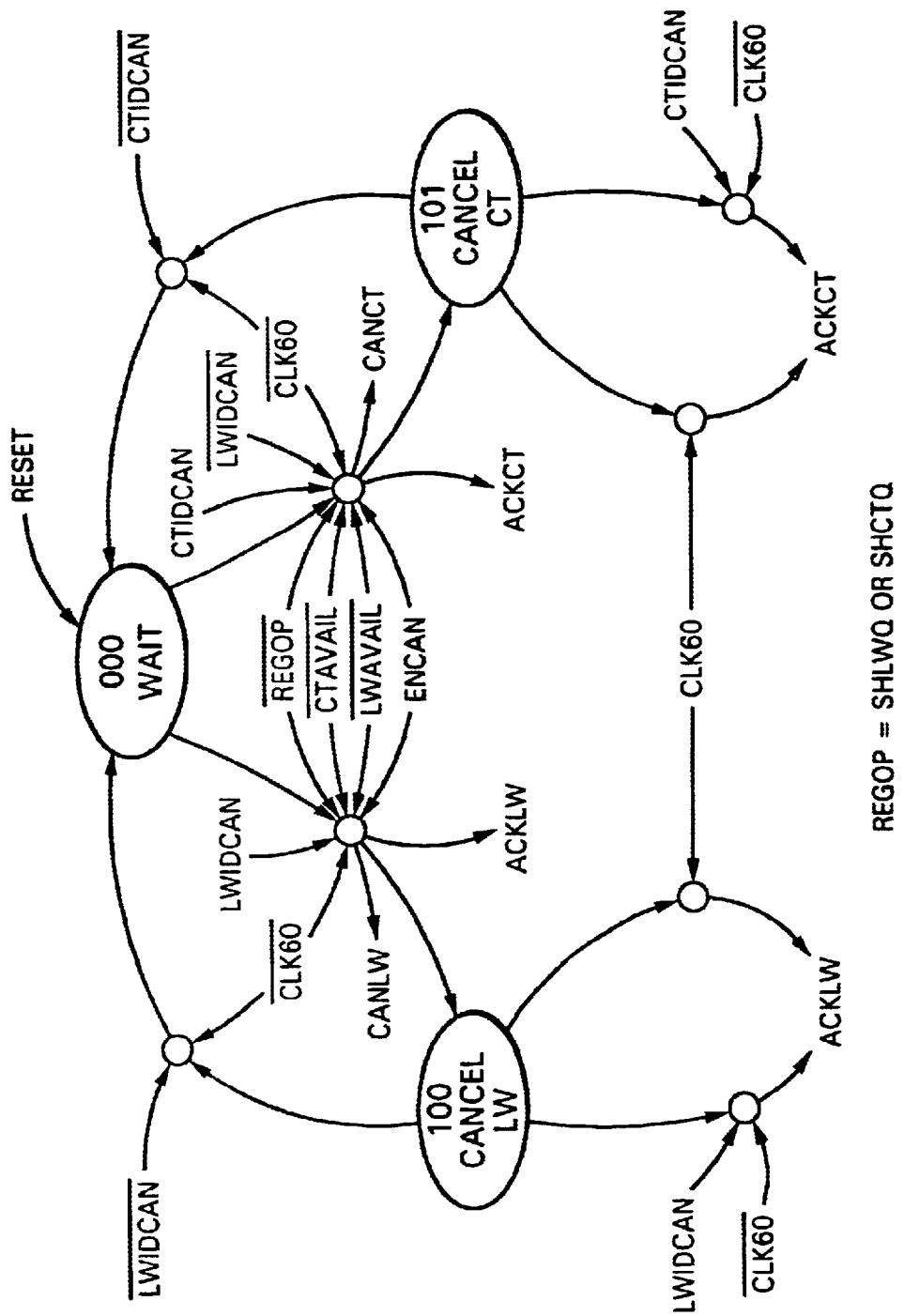
FIG. 5B is the user notifying the memory that the object indicated by the ID number is being canceled.

Referring to FIG. 5B, the arbiter function begins a PCI operation to cancel an object when a user is requesting this action and no higher priority queue operations are pending. When the user request is accepted, an acknowledgment is sent back to the user and the cancel signal is sent to the PCI cancel function. The arbiter will remain in either state "100" or "101" until the user removes the cancel request. This section of the arbiter state machine is synchronized to the rising edge of the 60 ns clock.

Figure 5C:
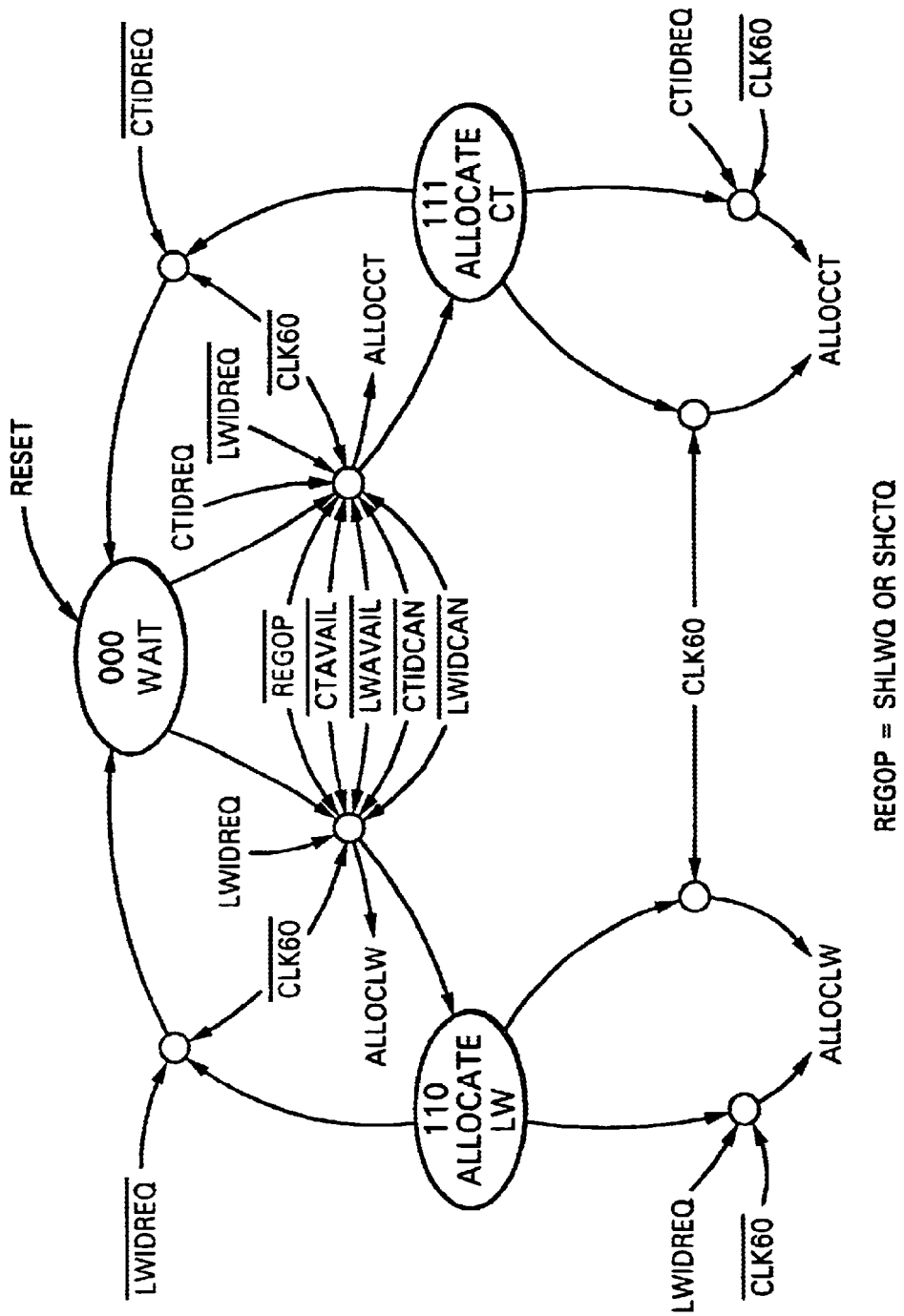
FIG. 5C is the user requesting the object ID number from the memory and FIG. 5D illustrates an empty queue register being assigned a unique object ID, all in accordance with a preferred embodiment of the present invention.

The arbiter function illustrated in FIG. 5C is used when a user requests a new ID. In this situation the ID has previously been created and this function causes the ID number to be sent to the user. This also updates the queue register to show that the object is active instead of in reserve. This section of the arbiter state machine is synchronized with the rising edge of the 60 ns clock.

Figure 5D:
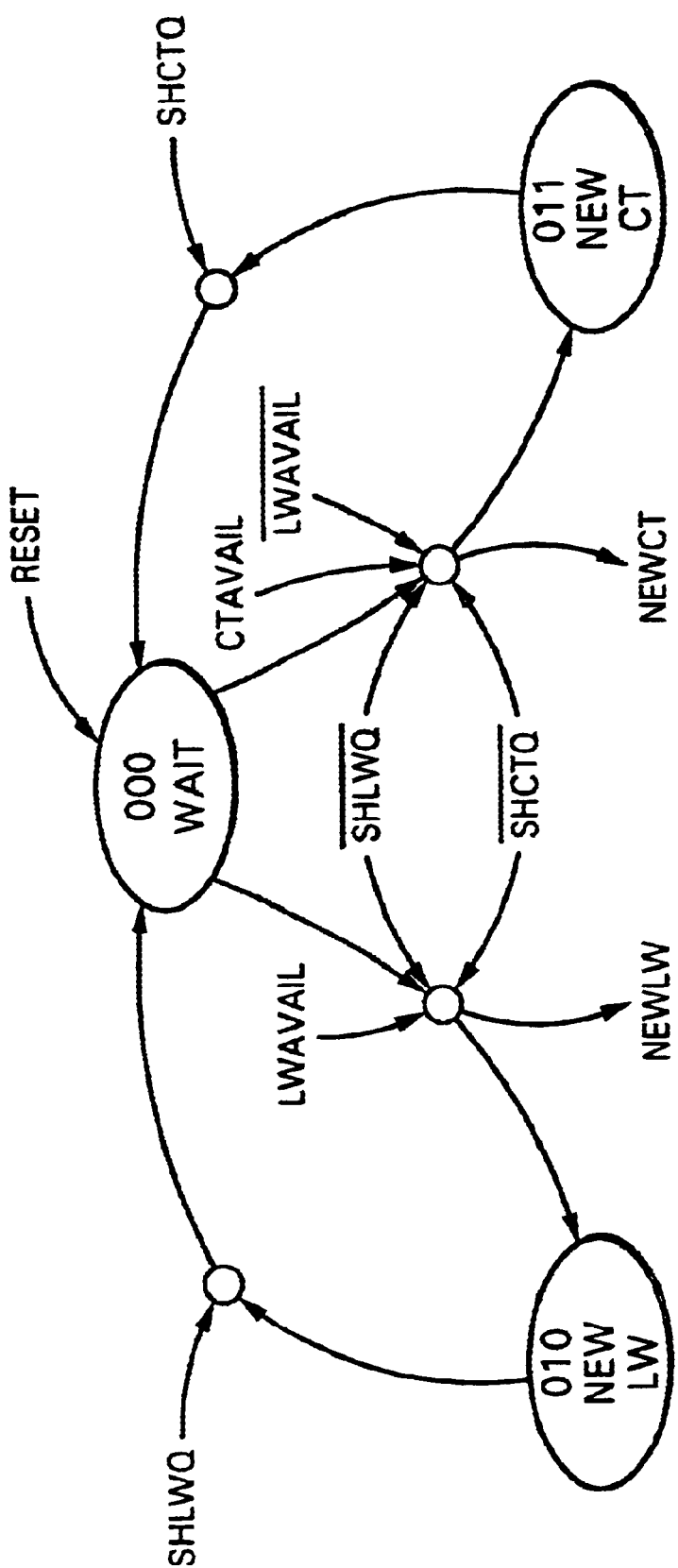

The arbiter function in FIG. 5D has higher priority than any other operation. It is used to create a new ID and assign it to an unused queue register. SHLWQ and SHCTO signals are generated by the queues whenever they are busy with any operation.

The following signals are used to transfer data from the memory to the LWD user. The output interface bus is used to transfer object data from the memory to the users. The signals that communicate between the memory and the users are described as follows:

LWD(32:0) This bus is a positive active output from the memory. It is used to transfer data to the LWD user. Bit #32 is a parity bit representing even parity across the other thirty-two bits.

LWDOBJ(2:0) These three positive active bits are memory inputs. They identify the object for which the LWD user is requesting data. Every object that passes through the memory is given an arbitrary identification number as defined by this bit combination. No two objects in memory at the same time will ever have the same ID.

LWDEMP(7:0) These eight positive active bits are memory outputs. Each bit is associated with an object's memory segment and indicate an empty condition. Example: If object three is empty, then bit#3 (LWDEMP(3)) will be active.

LWDREQ This positive active memory input tells the memory to send data to the LWD user. The LWDOBJ signals identify the object to send.

LWDVALID This is a positive active memory output. It tells the LWD user that the requested data is being put on the bus.

LWC Data Transfer signals

These signals are used to perform the transfer of data from the memory to the LWC user and consist of the following signals:

LWC(32:0) This bus is a positive active output from the memory. It is used to transfer data to the LWC user. Bit #32 is a parity bit representing even parity across the other thirty-two bits.

LWCOBJ(2:0) These three positive active bits are memory inputs. They identify the object for which the LWC user is requesting data. Every object that passes through the memory is given an arbitrary identification number as defined by this bit combination. No two objects in memory at the same time will ever have the same ID.

LWCEMP(7:0) These eight positive active bits are memory outputs and each bit is associated with an object's memory segment and indicate an empty condition. Example: If object six is empty, then bit#6 (LWCEMP(6)) will be active LWCREQ This positive active memory input tells the memory to send data to the LWC user. The LWCOBJ signals identify the object to send.

LWCVALID This is a positive active memory output. It tells the LWC user that the requested data is being put on the bus.

CT Data Transfer Signals

These signals are used to perform the transfer of data from the memory to the CT user.

CT(32:0) This bus is a positive active output from the memory. It is used to transfer data to the CT user. Bit #32 is a parity bit representing even parity across the other thirty-two bits.

CTOBJ(2:0) These three positive active bits are memory inputs. They identify the object for which the CT user is requesting data. Every object that passes through the memory is given an arbitrary identification number as defined by this bit combination. No two objects in memory at the same time will ever have the same ID.

CTEMP(7:0)These eight positive active bits are memory outputs. Each bit is associated with an object's memory segment and indicates an empty condition. Example: If object one is empty, then bit#1 (CTEMP(1)) will be active.

CTREQ This positive active memory input tells the memory to send data to the CT user. The CTOBJ signals identify the object to send.

CTVALID This is a positive active memory output. It tells the CT user that the requested data is being put on the bus.

LW Object ID Support signals

These signals are used to perform the two LW-memory ID operations, activate an object and notify the memory that an object is no longer needed.

LWIDREQ This is a positive active memory input signal. It tells the memory to identify the next available object and mark the object as active.

LWRIDACK is a positive active memory output. It tells the LW user that the request (LWIDREQ) to activate an object has been accepted.

LWAID(2:0)These three positive active bits are memory outputs. They are used during the activation of a new object to pass the ID number to the LW user.

LWIDCAN This signal is a positive active memory input. It is used to tell the memory that a particular LW object is no longer needed.

LWOID(2:0) These three memory input signals are positive active. They are used to identify the LW object that is no longer needed.

LWCIDACK This is a positive active memory output signal. It is used to tell the LW user that the cancel operation (LWIDCAN) has been accepted.

CT Object ID Support signals

These signals are used to perform the two CT-memory ID operations of activating an object and notifying the memory that an object is no longer needed.

CTIDREQ This is a positive active memory input signal. It tells the memory to identify the next available object already in memory and mark it as active.

CTRIDACK is a positive active memory output. It tells the CT user that the request (CTIDREQ) to activate an object has been accepted.

CTAID(2:0) These three positive active bits are memory outputs. They are used during the activation of a new object to pass the ID number to the CT user.

CTIDCAN This signal is a positive active memory input. It is used to tell the memory that a particular CT object is no longer needed.

CTOID(2:0) These three memory input signals are positive active. They are used to identify the CT object that is no longer needed.

CTCIDACK This is a positive active memory output signal. It is used to tell the CT user that the cancel operation (CTIDCAN) has been accepted.

Figure 6A:
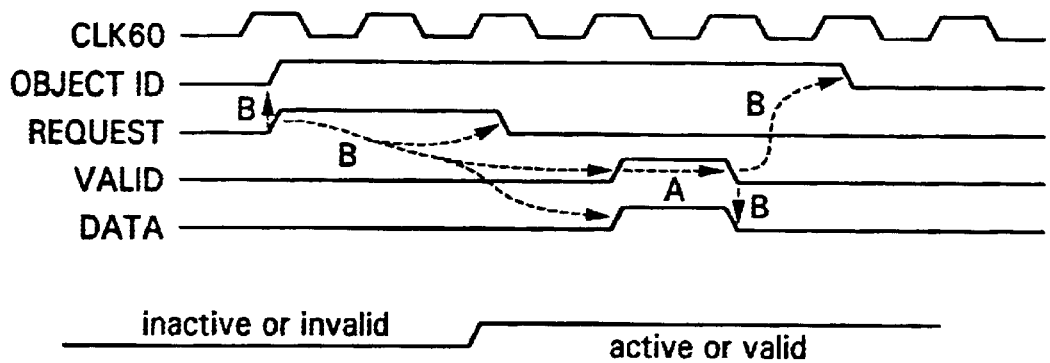
FIGS. 6A–6C, depicts output interface sequences in accordance with a preferred embodiment of the present invention.
Figure 6B:
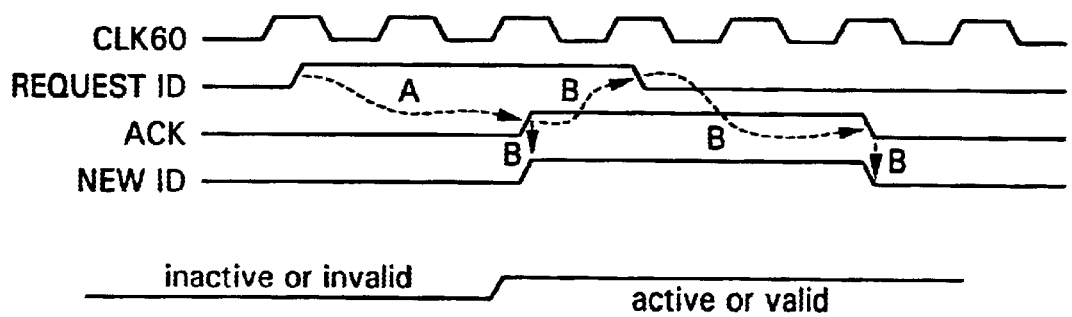
Figure 6C:
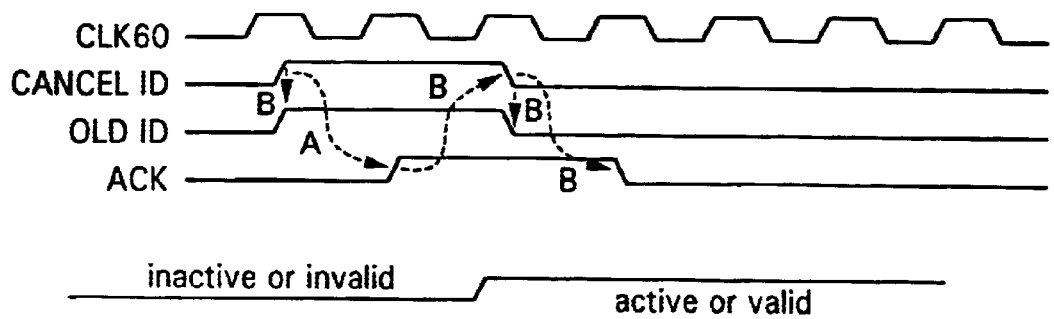

FIGS. 6A–6C, illustrate data transfer from the memory system to a user and object management operations in accordance with a preferred embodiment of the present invention. The sequence in FIG. 6A shows the data transfer from the memory to an LWD, LWC or CT user of a single word of data. The memory determines the amount of data to transfer and usually sends eight words. FIG. 6B shows a user requesting a new object ID from the memory. When a user requests a new object ID from the memory, the memory sends the ID of the next inactive object in the queue.

FIG. 6C sequence shows a user telling the memory that a particular object is no longer needed. The user controls how long an object is kept active. When a user decides that an object is no longer needed, a cancel object sequence is performed. If any data is still in the memory, it is discarded. After this sequence is complete, a separate sequence is initiated by the memory to notify the PCI function that the object is no longer needed.

Referring to FIG. 7, a state machine for transferring data between the memory and PCI function in accordance with a preferred embodiment of the present invention, is depicted. The depicted state machine performs data transfer between memory and the PCI function. The initial operation is to activate a CHOOSE signal. This signal causes a choice to be made as to which section of memory should receive more data. Once the choice has been made, the user and the object ID are saved in registers and gated to the PCI function. The request level chosen is also sent to the PCI function. The balance of the state machine deals with the aforementioned possible responses that could be made by the PCI function: Skip, Empty, Valid and Valid with empty.

Figure 8:
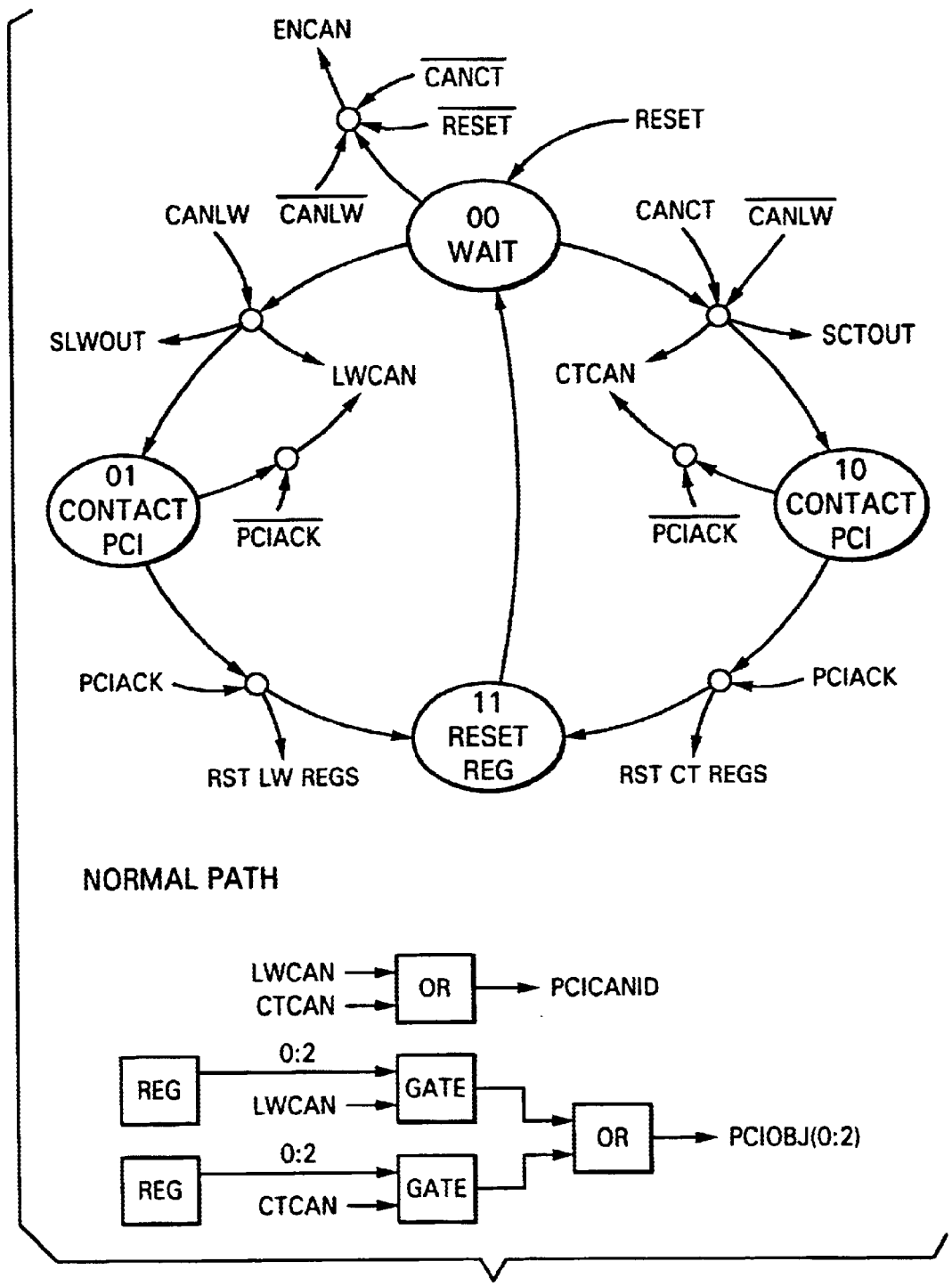
FIG. 8, a state machine for controlling handshakes with the PCI function to cancel an object in accordance with a preferred embodiment of the present invention.

Referring now to FIG. 8, a state machine for controlling handshakes with the PCI function to cancel an object in accordance with a preferred embodiment of the present invention, is illustrated.

Figure 9:
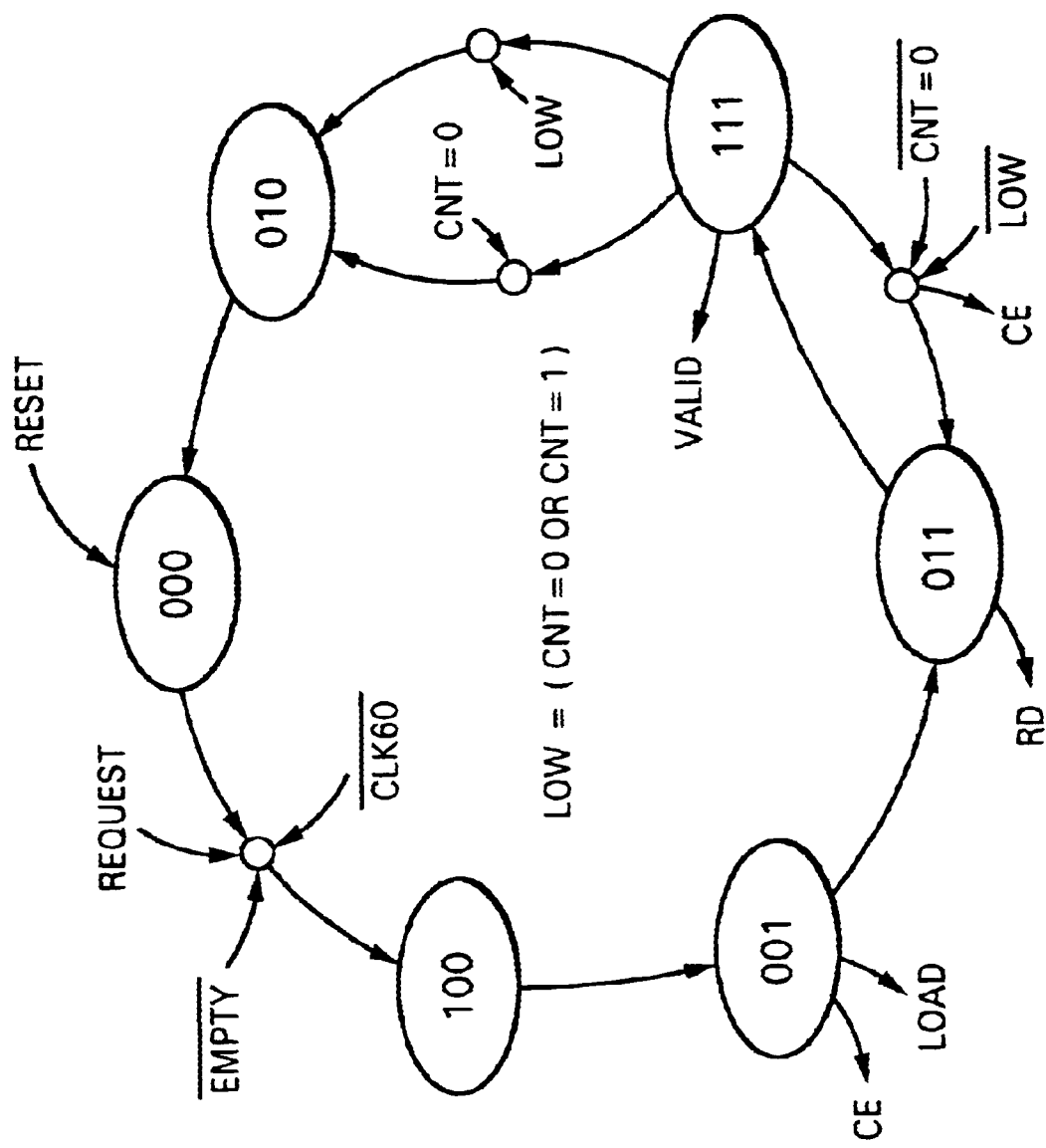
FIG. 9, a state machine for reading and transferring data to a user in accordance with a preferred embodiment of the present invention.

Referring now to FIG. 9, a state machine for reading and transferring data to a user in accordance with a preferred embodiment of the present invention, is illustrated. The state machine performs memory read and transfer of data to the user from memory. A counter is utilized to limit the transfer to eight words. Handshake signals and the data are synchronized with the rising edge of the 60 ns clock. The memory system contains three of the subject state machine, one for each of the three users (LWD, LWC and CT).

System Support

CLK30 This memory input is a free running clock having a period of 30 ns. It is synchronized to the PCI bus clock.

CLK60 This memory input is a free running clock having a period of 60 ns. It's positive going edge occurs at the same time as a positive going edge of CLK30.

SYSRST is a negative active memory input and is used as a master reset for the memory system.

A four-color printer receives a print job data stream composed of data objects. The objects correspond to images and text to be printed. Some data is related to individual dots on a page while other data (object header) is related to controlling where the object is to be placed on a page. The object data is stored in data memory and object headers are stored in header memory. There are two types of objects, continuous tone and line-work. The line-work object is further divided into line-work control and line-work data. The memory system stores the object data for up to eight objects of each type at a time. The object headers are stored in a separate memory. The header memory stores up to eight objects of each type (LW, CT) for two colors. Users process this data.

Flow of data is uni-directional (PCI function to memory to users). The memory utilizes dual-port memory elements, or chips. This allows the input and output ports to operate independently of each other. The output port is dedicated to sending data to the users. The memory address space is divided into 24 regions. The addressing within each region is generated by independent counters. The amount of data stored in each memory region is generated by independent counters. The memory and the counters are all operated so that the memory system becomes 24 independent, first-in-first-out (FIFO) memory elements with status flags. The 24 FIFOs are organized as three groups of eight FIFOs each and each group is dedicated to providing data to one of the three users. The user ID is used to select the group and the object ID is used to select an object within a group. Each of the three users and the input PCI function can be transferring data to/from the memory at the same time.

The present invention is a system comprising an interface for retrieving data objects, a memory for manipulating and producing a data stream of the data objects and an output interface for directing the data streams to users. In the present embodiment, there are three users that process data objects retrieved from a PCI function of a computing system. The objects make up images and data that are to be printed on a page. The object data is sent to the memory to store temporarily and then forwarded through the output interface to a requesting user. The need for a large RAM memory to store large amounts of data is obviated by the design of the memory. The memory acts like a set of FIFOs multiplexed into three different buses. Header memory can be read out of sequence and objects can be started and released out of order, freeing up memory space. Input buffer FIFOs in each de-compressor module provides the ability to work on multiple objects each clock cycle. The design allows high performance with low latency for multiple devices using multiple interleaved objects simultaneously.

This invention is described in a preferred embodiment in the preceding description with reference to the figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the present invention. For example, the present invention may be implemented using any combination of computer programming software, firmware or hardware. As a preparatory step to practicing the invention or constructing an apparatus according to the invention, the computer programing code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the present invention with appropriate standard computer hardware to execute the code contained therein. An apparatus for practicing the invention could be one or more computers and storage systems containing or having network access to computer program(s) coded in accordance with the invention.

While the invention has been particularly shown and described with reference to a preferred embodiment, it will be understood by those skilled in the art that various changes in form and detail may be made therein without departing from the spirit and scope of the invention.

What is claimed is:

1. A method for transferring data to a plurality of users, said method comprising the steps of:

responsive to a request, activating data objects for processing, said data objects being stored in an identified memory in a bank of memories, said bank of memories being classified as an independent group;

transferring identifiers associated with said data objects to said plurality of users, said identifiers identifying which identified memory in said bank of memories contains a specific data object;

sending status information that indicates whether said identified memory assigned to each said data object contains any data;

transferring said data objects with data;

discarding said data objects with no data; and releasing each said associated identifier.

2. The method of claim 1, further comprising:

requesting said data object transfer from said identified memory, wherein said data object transfer can include multiple words.

3. The method of claim 1, further comprising:

assigning said released associated identifier to another data object.

4. The method of claim 1, wherein said bank of memories is a bank of First In First Out (FIFO) memories.

5. A system for transferring data to a plurality of users, comprising:

program logic for activating data objects for processing, said data objects being stored in an identified memory in a bank of memories, said bank of memories being classified as an independent group;

program logic for transmitting identifiers associated with each said data objects to of said plurality of users, said identifiers identifying which identified memory in said bank of memories contains a specific data object;

transmission circuitry for sending status information that indicates whether said identified memory assigned to each said data object contains any data;

logic circuitry for transferring said data objects with data;

logic for discarding said data objects with no data; and logic means for releasing each said associated identifier.

6. The system of claim 5, further comprising:

request logic for requesting each said data object transfer from said identified memory, wherein said transfer can include multiple words.

7. The system of claim 5, further comprising:

means for assigning each said released associated identifier to another data object.

8. The system of claim 5, wherein said bank of memories is a bank of First In First Out (FIFO) memories.

9. A computer program product having instructions within a computer readable medium for transferring data to a plurality of users, comprising:

instructions within said computer program product for activating a data object for processing in response to a request from each one of said plurality of users, wherein said data object is stored in an identified memory in a bank of memories, said bank of memories being classified as an independent group;

instructions within said computer program product for transferring an identifier associated with each said data object to each one of said plurality of users, said identifiers identifying which identified memory in said bank of memories contains a specific data object;

instructions within said computer program product for sending status information that indicates whether said identified memory assigned to each said data object contains any data;

instructions within said computer program product for transferring said data objects with data;

instructions within said computer program product for discarding said data objects with no date; and instructions within said computer program product for releasing each said associated identifier.

10. The computer program product of claim 9, further comprising:

instructions within said computer program product for requesting each said data object transfer from said identified memory, wherein said transfer can include multiple words.

11. The computer program product of claim 9, further comprising:

instructions within said computer program product for assigning said released associated identifier to another data object.

12. The computer program product of claim 9, wherein said bank of memories is a bank of First In First Out (FIFO) memories.

* * * * *